United States Patent
Kim et al.

(10) Patent No.: US 10,557,979 B2
(45) Date of Patent: Feb. 11, 2020

(54) SUBSTRATE FOR WIRE GRID POLARIZER, WIRE GRID POLARIZER, MANUFACTURING METHOD FOR WIRE GRID POLARIZER, AND DISPLAY DEVICE INCLUDING WIRE GRID POLARIZER

(71) Applicant: Samsung Display Co., Ltd., Yongin-si (KR)

(72) Inventors: Si Kwang Kim, Daegu (KR); Han Su Kim, Seoul (KR); Seung-Yeon Chae, Hwaseong-si (KR); Se Hee Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 336 days.

(21) Appl. No.: 15/655,851

(22) Filed: Jul. 20, 2017

(65) Prior Publication Data

US 2018/0088265 A1    Mar. 29, 2018

(30) Foreign Application Priority Data

Sep. 29, 2016  (KR) .......................... 10-2016-0125666

(51) Int. Cl.
*G02B 5/30*   (2006.01)
*G02F 1/1335*   (2006.01)

(52) U.S. Cl.
CPC ..... *G02B 5/3058* (2013.01); *G02F 1/133512* (2013.01); *G02F 1/133528* (2013.01); *G02F 1/133514* (2013.01); *G02F 2001/133548* (2013.01)

(58) Field of Classification Search
CPC ............. G02B 5/3058; G02F 1/133528; G02F 2001/133548; G03F 7/0005

USPC ................. 359/485.05, 478.03, 900; 349/96
See application file for complete search history.

(56) References Cited

U.S. PATENT DOCUMENTS

| | | | | |
|---|---|---|---|---|
| 5,630,902 | A * | 5/1997 | Galarneau | B29O 33/38 156/379.6 |
| 7,106,507 | B2 * | 9/2006 | Lee | B82Y 30/00 216/24 |
| 7,220,371 | B2 * | 5/2007 | Suganuma | G02B 5/3058 205/79 |
| 9,631,068 | B2 * | 4/2017 | Takakuwa | G03F 7/0002 |
| 9,658,484 | B2 * | 5/2017 | Lee | G02F 1/133528 |
| 2006/0279842 | A1 * | 12/2006 | Kim | G02B 5/3058 359/485.05 |
| 2013/0270223 | A1 * | 10/2013 | Lee | G03F 7/031 216/24 |
| 2014/0349420 | A1 | 11/2014 | Kim | |
| 2016/0161653 | A1 * | 6/2016 | Kim | C23C 16/01 359/485.05 |

(Continued)

FOREIGN PATENT DOCUMENTS

| | | |
|---|---|---|
| JP | 2007-310246 | 11/2007 |
| JP | 2016-071306 | 5/2016 |

(Continued)

*Primary Examiner* — Ricky D Shafer
(74) *Attorney, Agent, or Firm* — H.C. Park & Associates, PLC

(57) ABSTRACT

A wire grid polarizer substrate including a wire grid base layer having a first surface and a second surface opposing each other, and an engraved trench extending along a first direction and having a concave shape penetrating into the second surface from the first surface of the wire grid base layer.

7 Claims, 23 Drawing Sheets

(56) References Cited

U.S. PATENT DOCUMENTS

| | | | | |
|---|---|---|---|---|
| 2016/0299380 A1* | 10/2016 | Nam | ................. | G02F 1/133528 |
| 2018/0024399 A1* | 1/2018 | Han | ..................... | G02B 5/3058 |
| | | | | 349/43 |
| 2018/0059477 A1* | 3/2018 | Jang | ..................... | G02B 5/3058 |
| 2018/0085973 A1* | 3/2018 | Kim | ....................... | B29C 33/42 |

FOREIGN PATENT DOCUMENTS

| | | |
|---|---|---|
| KR | 10-1259846 | 5/2013 |
| KR | 10-1279468 | 6/2014 |
| KR | 10-2014-0139678 | 12/2014 |

* cited by examiner

SUBSTRATE FOR WIRE GRID POLARIZER, WIRE GRID POLARIZER, MANUFACTURING METHOD FOR WIRE GRID POLARIZER, AND DISPLAY DEVICE INCLUDING WIRE GRID POLARIZER

CROSS-REFERENCE TO RELATED APPLICATION

This application claims priority from and the benefit of Korean Patent Application No. 10-2016-0125666, filed on Sep. 29, 2016, which is hereby incorporated by reference for all purposes as if fully set forth herein.

BACKGROUND

Field

Exemplary embodiments relate to a wire grid polarizer substrate, a wire grid polarizer, a manufacturing method thereof, and a display device including the wire grid polarizer.

Discussion of the Background

A polarizer is an optical filter that may pass light waves of a specific polarization and block light waves of other polarizations. The polarizer typically has a linear grating or stripe-shaped structure with a pitch smaller than the size of a wavelength of light to be separated in order to separate light into a polarized light.

In general, the polarizer has a pitch of about 20% of the wavelength in order to be used in a visible light region having a wavelength in the range of 400 nm to 700 nm. Accordingly, a polarizer having a pitch of at least 130 nm or less may be used in the visible light region.

However, in manufacturing a polarizer having a fine pitch, such as less than 130 nm, there is a high possibility for occurrence of a defect. Defects in the manufacturing process may deteriorate a product yield, thereby reducing the productivity and efficiency. As such, there is a need for a technique for preventing the occurrence of defects in the manufacturing process of a polarizer having a fine pitch.

The above information disclosed in this Background section is only for enhancement of understanding of the background of the inventive concept, and, therefore, it may contain information that does not form the prior art that is already known in this country to a person of ordinary skill in the art.

SUMMARY

The exemplary embodiments provide a wire grid polarizer substrate, a wire grid polarizer, a manufacturing method thereof, and a display device including the wire grid polarizer, which may improve productivity by reducing a defect-generating possibility in the manufacturing process.

The technical object to be achieved by the present invention is not limited to the aforementioned technical object, and other unmentioned technical objects will be obviously understood by those skilled in the art from the description below.

According to an exemplary embodiment, a wire grid polarizer substrate includes a wire grid base layer having a first surface and a second surface opposing each other, and an engraved trench extended along a first direction and having a concave shape penetrating into the second surface from the first surface of the wire grid base layer.

The wire grid polarizer substrate may further include a planarization layer disposed on the second surface of the wire grid base layer.

The engraved trench may have the same thickness as the wire grid base layer.

The wire grid polarizer substrate may further include an anti-oxidation layer disposed on the first surface of the wire grid base layer, in which the engraved trench may extend from a surface of the anti-oxidation layer to an inside of the wire grid base layer such that a thickness of the engraved trench is a sum of thicknesses of the anti-oxidation layer and the wire grid base layer.

The engraved trench may include a bottom surface extending in the first direction and disposed in parallel with the first surface of the wire grid base layer, and a pair of side surfaces disposed to connect the first surface of the wire grid base layer to the bottom surface of the engraved trench.

The engraved trench may have a quadrangular shape in a cross-sectional view in a thickness direction of the wire grid base layer.

According to an exemplary embodiment, a manufacturing method of a wire grid polarizer includes forming a wire grid polarizer substrate including an engraved trench extending along a first direction, applying a liquid mask resin to the wire grid polarizer substrate, imprinting the liquid mask resin by using a wire grid polarizer mold including an imprint mold pattern, forming an etching mask by curing the liquid mask resin, forming a wire grid by removing a portion of the wire grid polarizer substrate, and forming a grid bridge by removing the etching mask.

The manufacturing method may further include forming a transparent grid by filling a transparent material in the wire grid polarizer substrate from which the etching mask is removed.

The wire grid polarizer substrate may further include a planarization layer disposed on a first surface of the wire grid polarizer substrate, and the manufacturing method may further include removing the planarization layer after the etching mask is removed.

The wire grid polarizer substrate may further include a wire grid base layer and an anti-oxidation layer disposed on the wire grid base layer, and forming the wire grid may include first etching a portion of the anti-oxidation layer, and second etching a portion of the wire grid base layer.

The engraved trench may be formed in the wire grid polarizer substrate by removing a portion of the wire grid polarizer substrate with a photoresist process.

The engraved trench may be formed in the wire grid polarizer substrate by removing a portion of the wire grid polarizer substrate via laser cutting.

The liquid mask resin may be coated on the wire grid polarizer substrate by an inkjet method.

According to an exemplary embodiment, a wire grid polarizer includes a first grid bridge extending in a first direction, a plurality of transparent grid parts disposed in parallel and is extending from the grid bridge along a second direction crossing the first direction, and a plurality of wire grid parts disposed in parallel between the respective transparent grid parts, extending along the second direction, and disconnected by the first grid bridge.

The wire grid polarizer may further include a second grid bridge disposed in parallel to the first grid bridge, in which the first and second grid bridges connect a pair of transparent grid parts.

The first grid bridge and the transparent grid parts may include the same material.

The wire grid parts may include at least one metal of aluminum (Al), chromium (Cr), gold (Au), silver (Ag), copper (Cu), nickel (Ni), iron (Fe), tungsten (W), cobalt (Co), and molybdenum (Mo), an alloy thereof, or an oxide or nitride thereof.

A display panel may include a wire grid polarizer according to exemplary embodiments, and a color conversion panel disposed on the display panel.

The color conversion panel may include a plurality of color conversion layers configured to change a wavelength of light passing through the display panel, and a light blocking member disposed between the color conversion layers, and the first grid bridge may overlap the light blocking member.

A width of the first grid bridge measured along the second direction may be less than a width of the light blocking member.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
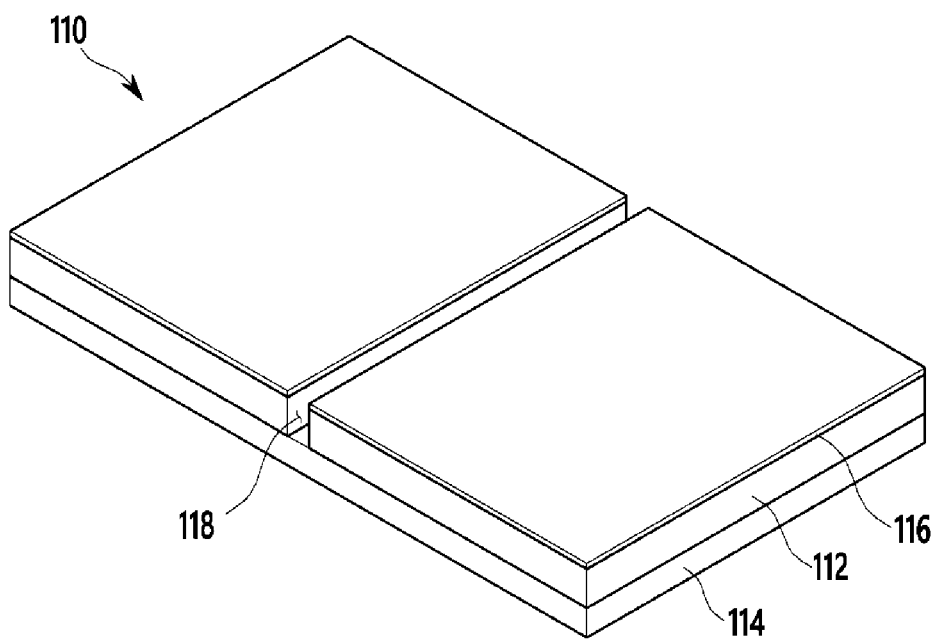
FIG. 1 is a perspective view illustrating a wire grid polarizer substrate according to an exemplary embodiment.
Figure 1:
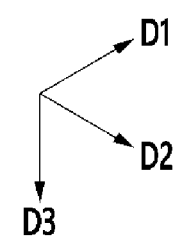

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
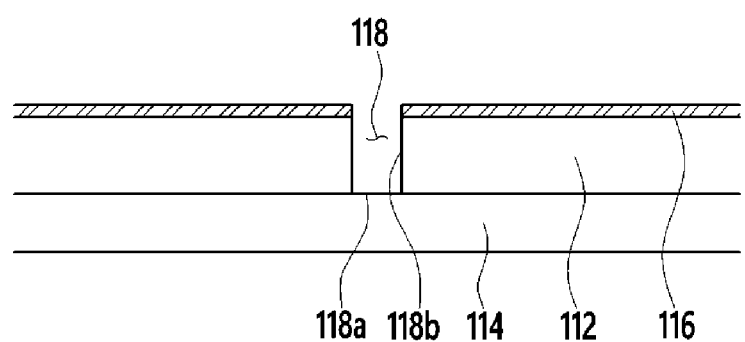
FIG. 2 is an enlarged view schematically illustrating an engraved trench of the wire grid polarizer substrate of FIG. 1.

FIG. 1 is a perspective view illustrating a wire grid polarizer substrate 110 according to an exemplary embodiment. FIG. 2 is an enlarged view schematically illustrating an engraved trench of the wire grid polarizer substrate 110 of FIG. 1.

Referring to FIG. 1, the wire grid polarizer substrate 110 according to an exemplary embodiment includes a wire grid base layer 112 and an engraved trench 118.

The wire grid base layer 112 may be a base layer, and a portion of the wire grid base layer 112 is removed during subsequent manufacturing process by etching to form a wire grid polarizer 100 having linear polarization. In an exemplary embodiment, the wire grid base layer 112 may be disposed in a display device 1000 (see FIG. 21) to polarize light transferred from a display panel 200 of the display device 1000.

According to an exemplary embodiment, the wire grid base layer 112 may include a metal. For example, the wire grid base layer 112 may include at least one of aluminum (Al), chromium (Cr), gold (Au), silver (Ag), copper (Cu), nickel (Ni), iron (Fe), tungsten (W), cobalt (Co), and molybdenum (Mo), and an alloy, oxide, or nitride thereof, without being limited thereto.

The engraved trench 118 is disposed in the wire grid base layer 112, and has a concave shape from one surface of the wire grid base layer 112 toward an inside thereof. As illustrated in FIG. 2, the engraved trench 118 may include a bottom surface 118a and a pair of side surfaces 118b.

The bottom surface 118a of the engraved trench 118 extends along the first direction D1, and is in parallel with a surface of the wire grid base layer 112. A top surface of the wire grid base layer 112 is spaced apart from the bottom surface 118a of the engraved trench 118, and a thickness direction of the wire grid base layer 112 is substantially parallel to a third direction D3.

The top surface of the wire grid base layer 112 may be connected to the bottom surface 118a of the engraved trench 118 by the pair of side surfaces 118b. Accordingly, the engraved trench 118 according to an exemplary embodiment has a quadrangular shape in a cross-sectional view, as shown in FIGS. 1 and 2.

FIG. 1 and FIG. 2 illustrate the engraved trench 118 having a rectangular cross-section, but the present invention is not limited thereto. For example, the engraved trench 118 may have a trapezoidal cross-sectional shape by forming the pair of side surfaces 118b to have a tapered surface during the process of forming the engraved trench 118.

Figure 3:
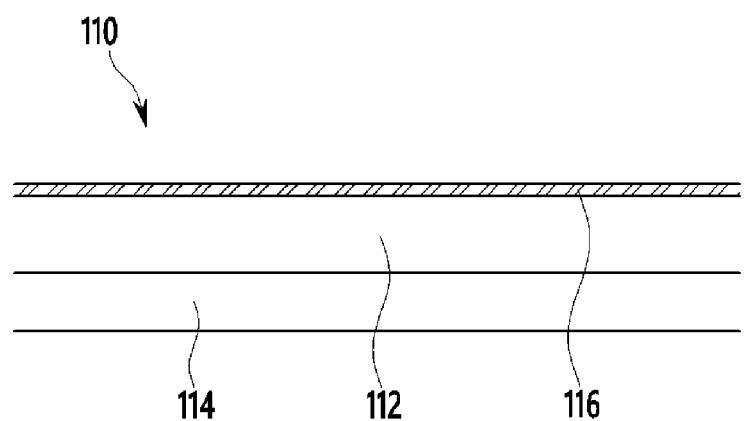
FIG. 3 is a side view illustrating the wire grid polarizer substrate of FIG. 1 when viewed in a second direction.

FIG. 3 is a side view illustrating the wire grid polarizer substrate 110 of FIG. 1 when viewed in the second direction D2. As shown in FIG. 1 to FIG. 3, the wire grid polarizer substrate 110 according to an exemplary embodiment may further include a planarization layer 114 and an anti-oxidation layer 116.

The planarization layer 114 is formed in a second surface of the wire grid base layer 112 opposite to the first surface on which the engraved trench 118 is formed. In FIG. 1 and FIG. 3, the planarization layer 114 is formed on a bottom surface of the wire grid base layer 112. In this manner, an operation error that may be caused by inclination of the wire grid polarizer substrate 110 in the process for manufacturing the wire grid polarizer 100 may be prevented.

According to an exemplary embodiment, the planarization layer 114 may include an organic layer. The planarization layer 114 including the organic layer is resistant to corrosion from an etchant that is used during subsequent manufacturing process of the wire grid polarizer 100. Accordingly, the planarization layer 114 may be used as an etch stop layer in an etching process for forming the engraved trench 118 or a plurality of parts of the wire grid 130 (see FIG. 13).

The anti-oxidation layer 116 may prevent oxidation of the wire grid base layer 112 and may include an inorganic material such as a silicon oxide ($SiO_x$), a silicon nitride ($SiN_x$), a metal oxide, or the like, which are relatively less reactive with oxygen than the wire grid base layer 112. In addition, the anti-oxidation layer 116 may include an organic material or an organic/inorganic composite, or may be formed by stacking any of these as a plurality of layers.

According to an exemplary embodiment, as illustrated in FIG. 1 and FIG. 2, the engraved trench 118 is formed by partially removing the anti-oxidation layer 116 and the wire grid base layer 112. In this case, the planarization layer 114 is maintained without being removed. Accordingly, the engraved trench 118 may be flush with the wire grid base layer 112 in a thickness direction. When the wire grid polarizer substrate 110 includes the anti-oxidation layer 116, the height of the engraved trench 118 may be the same as a sum of the thicknesses of the anti-oxidation layer 116 and the wire grid base layer 112.

The engraved trench 118 formed in the wire grid base layer 112 may function as a path, through which a mask resin 120 may flow along the first direction D1, during subsequent imprinting process that utilizes the liquid mask resin 120 and a mold. In this manner, defects such as bubble generation or filling failure that may occur during a manufacturing process using the liquid mask resin 120 may be prevented, thereby improving productivity of the product.

Hereinafter, a manufacturing method of the wire grid polarizer 100 using the wire grid polarizer substrate 110 will be described.

FIG. 1 to FIG. 19 are stepwise views illustrating the manufacturing method of the wire grid polarizer 100 according to an exemplary embodiment, observed in various directions, in a manufacturing order. However, the sequence of the manufacturing method is merely an example, and the sequence may be modified without being limited thereto.

First, a surface of the wire grid polarizer 100 is formed with the engraved trench 118 as illustrated in FIG. 1 to FIG. 3. The engraved trench 118 is formed in a first surface of the wire grid polarizer substrate 110 and extends in a longitudinal direction along the first direction D1. Since the detailed configuration and shape of the engraved trench 118 are the same as those described above, duplicate descriptions thereof will be omitted.

According to an exemplary embodiment, the engraved trench 118 may be formed by performing a photoresist process on the wire grid polarizer substrate 110, which may be easier to process a large substrate at a low cost, as compared to a laser cutting process described below.

Although not illustrated, the photoresist process for forming the engraved trench 118 may include, for example: applying a photoresist (not illustrated); exposing the photoresist; forming an engraved trench mask (not illustrated) by etching the photoresist; forming the engraved trench 118 by etching a portion of the wire grid polarizer substrate 110; and removing the engraved trench mask.

More particularly, the step of applying the photoresist includes applying a photo-curable photoresist material to the wire grid polarizer substrate 110. Next, an exposure mask (not illustrated) having blocked portions corresponding to the engraved trench 118 to be formed is positioned on a photoresist material, and then the photoresist material is exposed to form an engraved trench mask. Non-exposed portions, i.e., photoresist portions that correspond to the portions of the engraved trench 118 to be formed therein, are removed by etching, up to the wire grid polarizer substrate 110 to form the engraved trench 118.

In this case, the wire grid polarizer substrate 110 may include the planarization layer 114 as an etch stop layer. Accordingly, the wire grid polarizer substrate 110 is etched to the planarization layer 114. In addition, a surface of the wire grid polarizer substrate 110, on which the engraved trench 118 is not formed, may be protected from the etching process by a photoresist mask for the engraved trench 118. Thereafter, the photoresist mask disposed in a portion corresponding to the engraved trench 118 is removed to form the engraved trench 118.

According to an exemplary embodiment, the engraved trench 118 may alternatively be formed by partially removing the wire grid polarizer substrate 110 by laser cutting. In this manner, it may be possible to perform more precise processing and prevent occurrence of defects, such as undercut from utilizing etching process.

Figure 4:
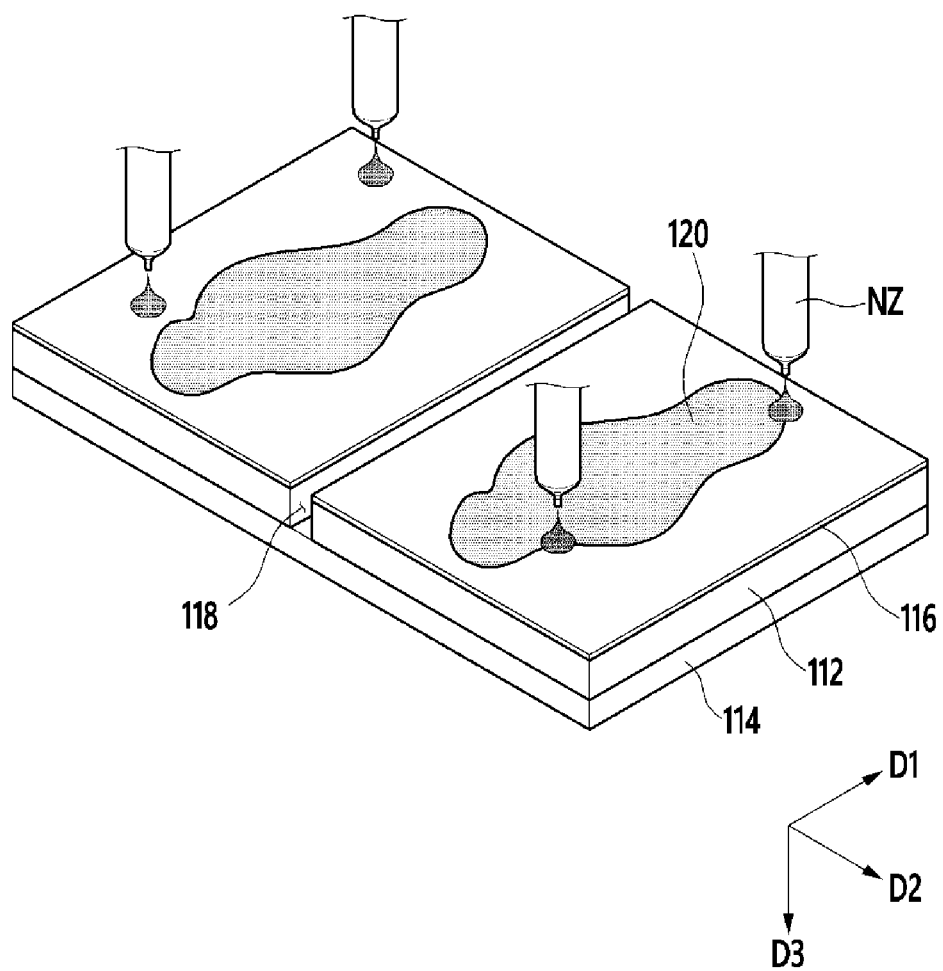
FIG. 4 is a perspective view schematically illustrating how a liquid mask resin is coated on the wire grid polarizer substrate of FIG. 1.
Figure 5:
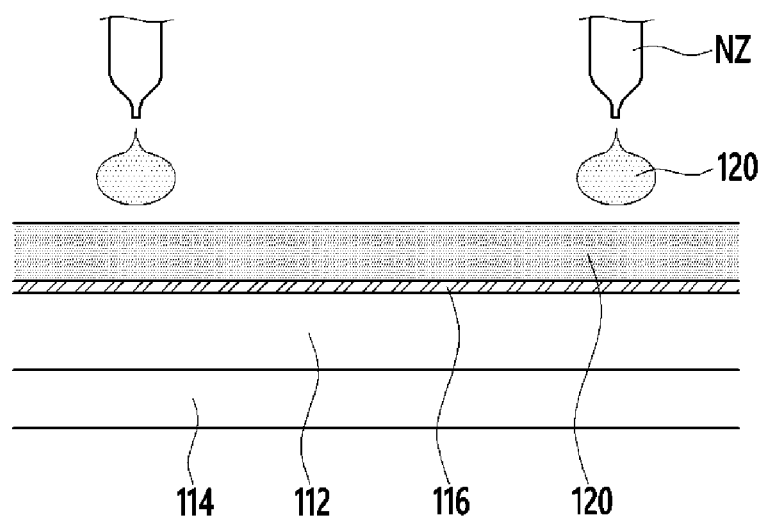
FIG. 5 is a side view illustrating FIG. 4 when viewed in the second direction.
Figure 6:
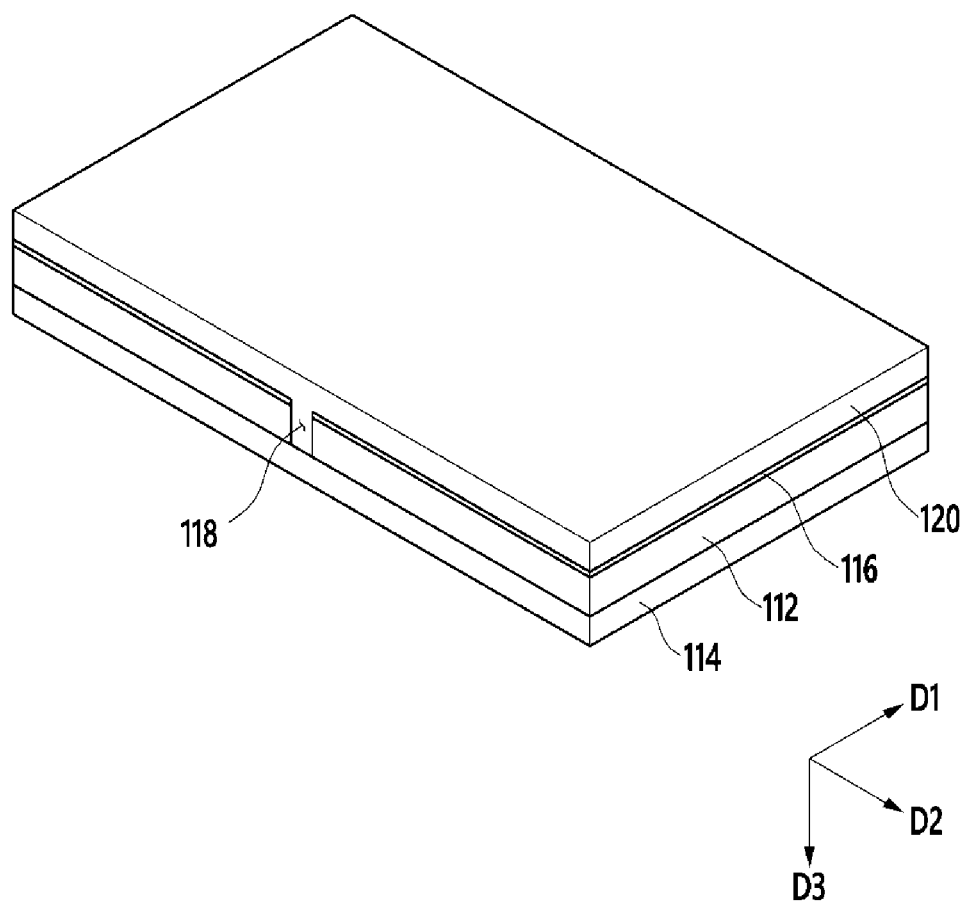
FIG. 6 is a perspective view illustrating how a liquid mask resin is completely coated on a wire grid polarizer substrate according to an exemplary embodiment.

After the engraved trench 118 is formed in the wire grid polarizer substrate 110, the liquid mask resin 120 is applied. FIG. 4 is a perspective view schematically illustrating how a liquid mask resin 120 is coated on the wire grid polarizer substrate 110 of FIG. 1 according to an exemplary embodiment. FIG. 5 is a side view illustrating FIG. 4 when viewed in the second direction, and FIG. 6 is a perspective view illustrating how the liquid mask resin 120 is completely coated on the wire grid polarizer substrate 110 according to an exemplary embodiment.

As illustrated in FIG. 4 and FIG. 5, according to an exemplary embodiment, the liquid mask resin 120 may be applied to a surface of the wire grid polarizer substrate 110 by an inkjet process, by which droplets are ejected through a plurality of nozzles NZ.

The liquid mask resin 120 has fluidity. Accordingly, the liquid mask resin 120 may flow onto the surface of the wire grid polarizer substrate 110 and into the engraved trench 118 formed in the wire grid polarizer substrate 110. Accordingly, as illustrated in FIG. 6, the liquid mask resin 120 may be uniformly distributed on the surface of the wire grid polarizer substrate 110 including the engraved trench 118. In FIG. 6, the liquid mask resin 120 is illustrated as precisely coinciding with the area of the surface of the wire grid polarizer substrate 110. However, the liquid mask resin 120 may be applied to an area smaller than that of the surface of the wire grid polarizer substrate 110, in consideration of extrusion of the surface of the wire grid polarizer substrate 110.

Figure 7:
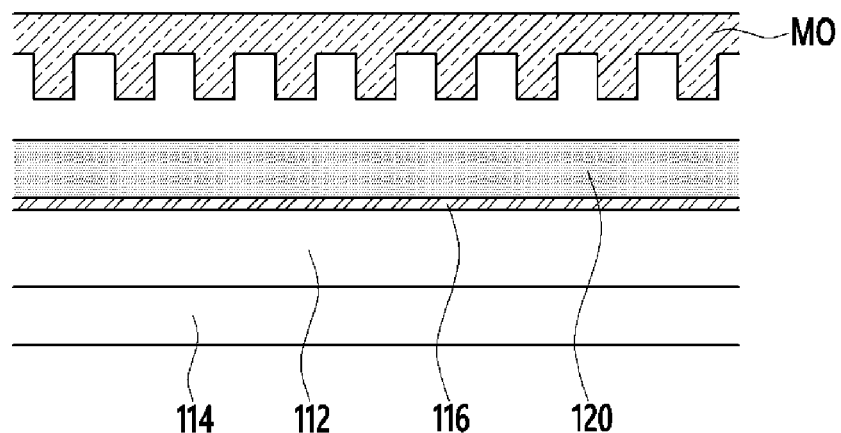
FIG. 7 illustrates how a mold is disposed to imprint a liquid mask resin according to an exemplary embodiment.
Figure 8:
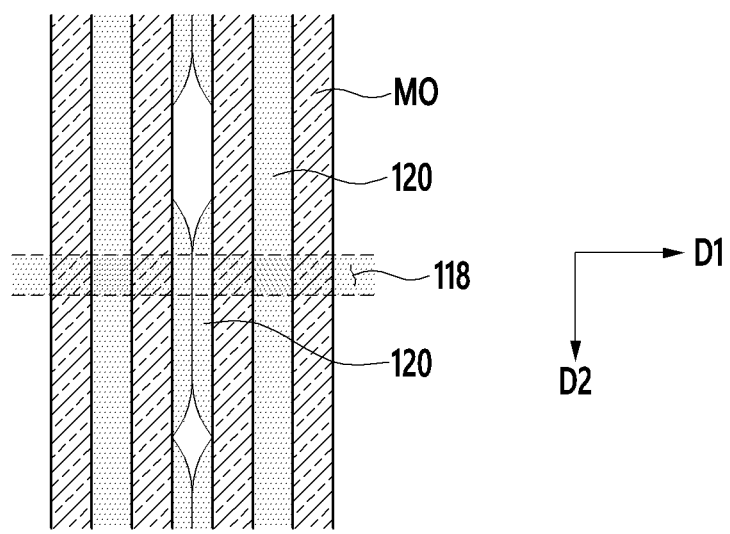
FIG. 8 illustrates how a mask resin is charged in an imprint-molding pattern according to an exemplary embodiment.

After the liquid mask resin 120 is applied to the surface of the wire grid polarizer substrate 110, a step of imprinting the liquid mask resin 120 is performed by using the wire grid polarizer mold MO including an imprint-molding pattern. FIG. 7 illustrates how a mold is disposed to imprint the liquid mask resin 120 according to an exemplary embodiment, and FIG. 8 illustrates how the mask resin 120 is charged in an imprint-molding pattern according to an exemplary embodiment.

The wire grid polarizer mold MO includes a plurality of imprint-molding patterns that extend in the second direction D2 crossing the first direction D1. The wire grid polarizer 100 and the wire grid polarizer mold MO for forming the wire grid polarizer 100 may include the wire grid 130 having a width of 130 nm or less and the imprint-molding pattern, respectively, in order to polarize a visible light region having a wavelength in a range of 380 nm to 780 nm. The width of the wire grid 130 may be 100 nm or less in order to provide excellent polarization performance.

As used herein, the term "width" refers to a length obtained by measuring the wire grid 130 and the imprint-molding pattern along the first direction D1. Thus, according to an exemplary embodiment, the imprint-molding pattern formed in the wire grid polarizer mold MO has a minute width of 130 nm or less. Accordingly, when the wire grid polarizer mold MO is imprinted in the liquid mask resin 120, a capillary phenomenon, through which the liquid mask resin 120 flows along a side wall of the imprint-molding pattern, may be generated. In this manner, the liquid mask resin 120 may be smoothly filled within the imprint-molding pattern formed along the second direction D2.

However, since the liquid mask resin 120 has spread anisotropy, filling the liquid mask resin 120 in the wire grid polarizer mold MO along the first direction D1 may not be smoothly performed. For example, bubbles may be generated in the liquid mask resin 120, or the liquid mask resin 120 may not be completely filled in the wire grid polarizer mold MO, which may cause defects in the mask when the resin is cured.

According to an exemplary embodiment, the wire grid polarizer substrate 110 includes the engraved trench 118 that provides a passage through which the liquid mask resin 120 may flow in the first direction D1, as shown in FIG. 8. In this manner, the liquid mask resin 120 may flow to a subsequent mold pattern through the engraved trench 118 formed in the wire grid polarizer substrate 110. Therefore, even when the liquid mask resin 120 has the spread anisotropy, a filing error that causes a defective mask may be prevented, thereby improving the product productivity.

Figure 9:
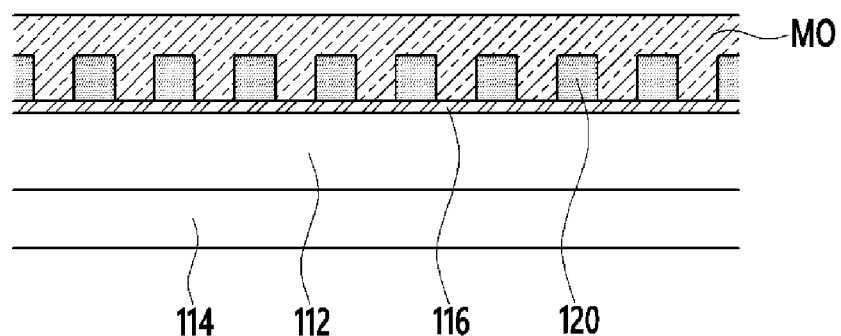
FIG. 9 schematically illustrates how a mask resin imprinted by a wire grid polarizer mold is cured according to an exemplary embodiment.
Figure 10:
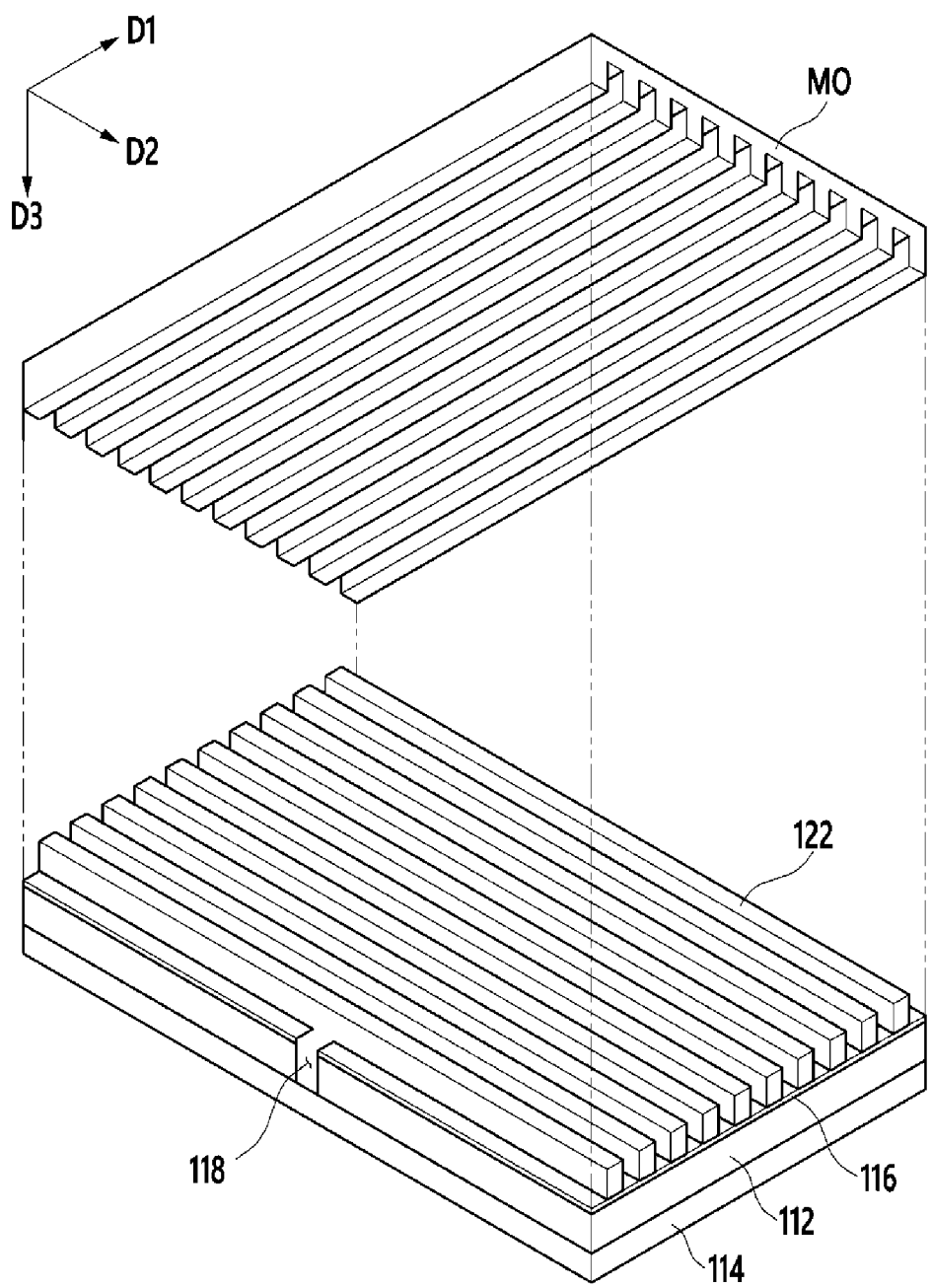
FIG. 10 is a perspective view schematically illustrating how an etching mask is formed by separating a wire grid polarizer mold from a completely cured mask resin according to an exemplary embodiment.
Figure 11:
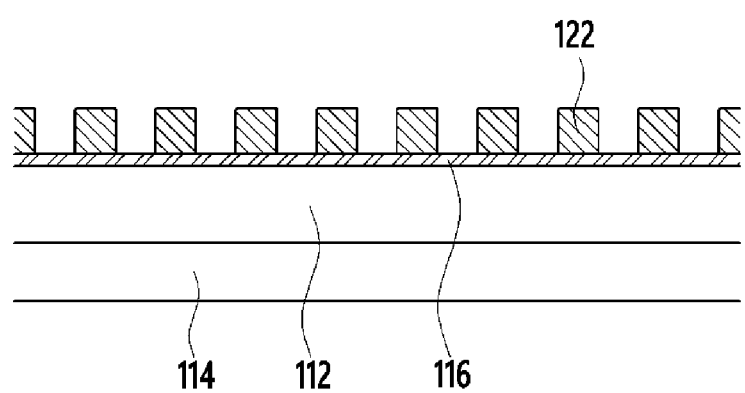
FIG. 11 is a side view illustrating FIG. 10 when viewed in the second direction.

When the liquid mask resin 120 is filled in the imprint mold pattern, a step of forming an etching mask 122 by curing the mask resin 120 is performed. FIG. 9 schematically illustrates how the mask resin 120 imprinted by a wire grid polarizer mold MO is cured according to an exemplary embodiment. FIG. 10 is a perspective view schematically illustrating how an etching mask 122 is formed by separating the wire grid polarizer mold MO from the cured mask resin 120, and FIG. 11 is a side view illustrating FIG. 10 when viewed in the second direction D2.

According to an exemplary embodiment, the mask resin 120 may be cured by light or heat, and includes a solvent that is non-volatile or has low volatility, such that the mask resin 120 may be utilized in an imprinting process.

As illustrated in FIG. 9, while the mask resin 120 is cured, the wire grid polarizer mold MO is not removed and may maintain the imprinted state on the mask resin 120. As a result, the shape of the mask pattern formed on the mask resin 120, which has fluidity, may not be changed and maintained until the curing step is completed.

As illustrated in FIG. 10, after the curing step is completed, the wire grid polarizer mold MO is separated from the mask resin 120. As illustrated in FIG. 10 and FIG. 11, the mask resin 120 is cured as the etching mask 122, which has a pattern transferred from the imprint-molding pattern of the wire grid polarizer mold MO. The etching mask 122 is used later as a mask to etch the wire grid polarizer substrate 110.

When the etching mask 122 is formed on the wire grid polarizer substrate 110, a step of forming the wire grid 130 and a grid bridge 150 is performed by etching the wire grid polarizer substrate 110.

As described above, the wire grid polarizer substrate 110 according to an exemplary embodiment includes an anti-oxidation layer 116 formed on the wire grid base layer 112 to prevent oxidation of the wire grid base layer 112. As such, etching the wire grid polarizer substrate 110 includes two etching steps, a first etching step for etching the anti-oxidation layer 116 and a second etching step for etching the wire grid base layer 112.

According to an exemplary embodiment, the anti-oxidation layer 116 may include an inorganic material such as a silicon oxide ($SiO_x$), a silicon nitride ($SiN_x$), a metal oxide, etc., which is relatively less reactive with oxygen than the wire grid base layer 112. For example, the anti-oxidation layer 116 may include at least one metal of aluminum (Al), chromium (Cr), gold (Au), silver (Ag), copper (Cu), nickel (Ni), iron (Fe), tungsten (W), cobalt (Co), and molybdenum (Mo), an alloy thereof, or a material different from that forming the wire grid base layer 112 including an oxide or nitride.

As described above, since the wire grid polarizer 100 has a minute width, there is a high possibility of causing a defect from the etching process, when the anti-oxidation layer 116 and the wire grid base layer 112 including different materials are removed by the same etching process.

Figure 12:
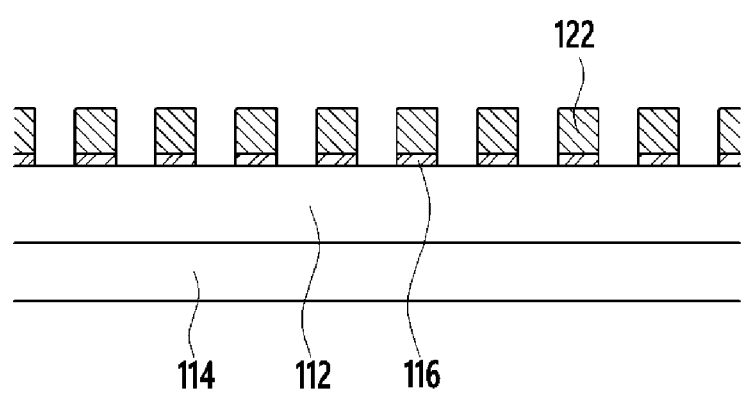
FIG. 12 schematically illustrates how an anti-oxidation layer in FIG. 10 is etched according to an exemplary embodiment.
Figure 13:
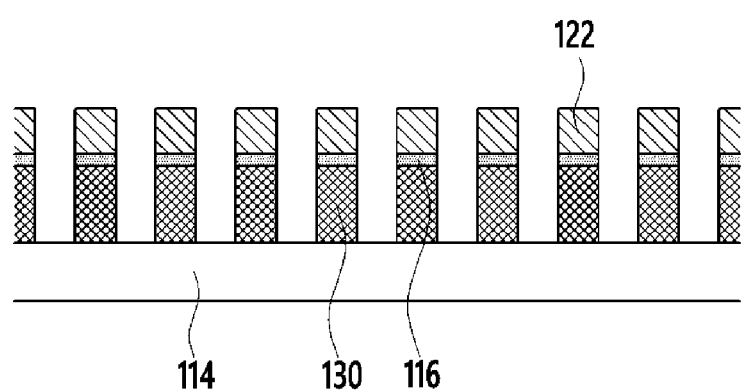
FIG. 13 schematically illustrates how a wire grid base layer of FIG. 12 is etched according to an exemplary embodiment.

Therefore, the etching process according to an exemplary embodiment etches the anti-oxidation layer 116 and the wire grid base layer 112 separately. FIG. 12 schematically illustrates how the anti-oxidation layer 116 in FIG. 10 is etched, and FIG. 13 schematically illustrates how the wire grid base layer 112 in FIG. 12 is etched according to an exemplary embodiment.

As illustrated in FIG. 12, the first etching step removes the anti-oxidation layer 116 formed between respective patterns of the etching mask 122, while maintaining the anti-oxidation layer 116 disposed below the etching mask 122. Next, as illustrated in FIG. 13, the second etching step etches the wire grid base layer 112 by using the etching mask 122. After the etching is completed, the wire grid 130 is formed in the wire grid base layer 112.

Figure 14:
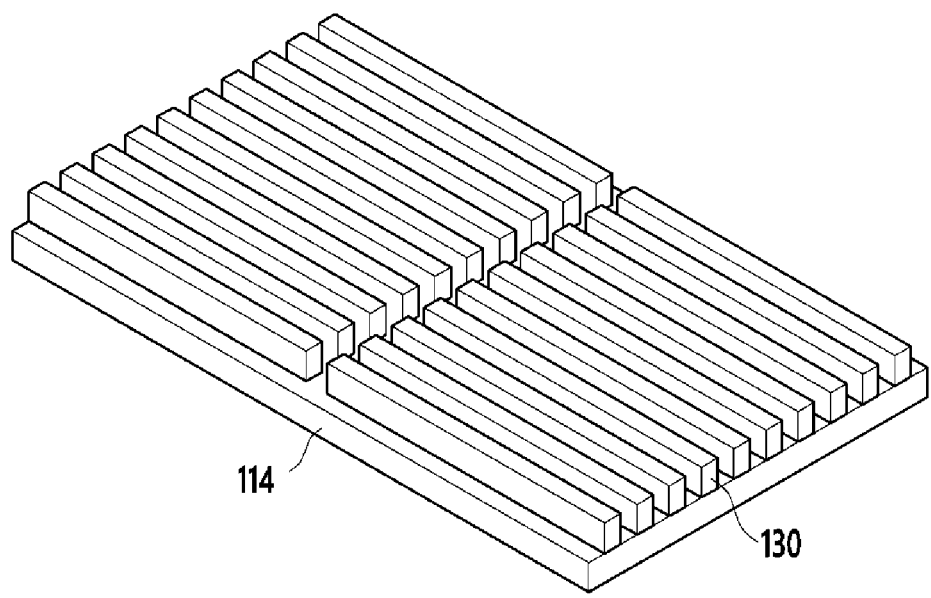
FIG. 14 is a perspective view schematically illustrating how an etching mask and an anti-oxidation layer of FIG. 13 are removed according to an exemplary embodiment.
Figure 14:
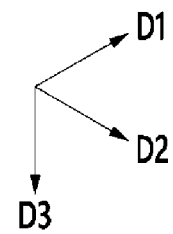

Thereafter, when the etching mask 122 is removed, the grid bridge 150 (see FIG. 16) that disconnects the parts of the wire grid 130 is formed. FIG. 14 is a perspective view schematically illustrating how the etching mask 122 and the anti-oxidation layer 116 of FIG. 13 are removed, and FIG. 15 is a side view illustrating FIG. 14 when viewed in the second direction D2.

According to an exemplary embodiment, the grid bridge 150 may have the same configuration as that of the engraved trench 118. However, for convenience of description, the engraved trench 118 refers to a structure formed in the wire grid base layer 112 before a linear polarization pattern for the wire grid polarizer 100 is formed, and the grid bridge 150 refers to a portion that disconnects the parts of the wire grid 130 having a linear polarization pattern after the linear polarization pattern is formed in the wire grid base layer 112. In other words, the engraved trench 118 refers to a structure formed before the linear polarization pattern is formed on the wire grid base layer 112, and the grid bridge 150 refers to the structure after the linear polarization pattern is formed.

The wire grid polarizer substrate 110 according to an exemplary embodiment includes the planarization layer 114 that may function as an etch stop layer. As such, etching of the wire grid base layer 112 may be stopped in the planarization layer 114, as shown in FIG. 14 and FIG. 15. As such, the parts of the wire grid 130, which are spaced apart from each other, disposed along the first direction D1, and disconnected by the grid bridge 150, may be maintained as one structure without being separated by the planarization layer 114.

Figure 15:
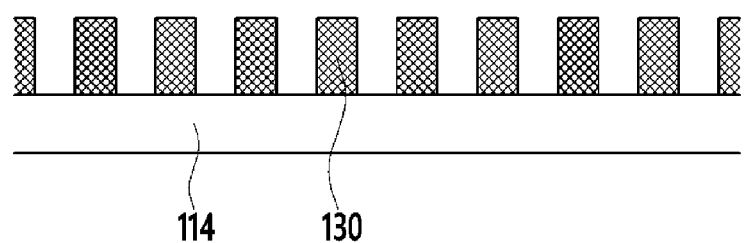
FIG. 15 is a side view illustrating FIG. 14 when viewed in the second direction.

Although the wire grid polarizer substrate 110 illustrated in FIG. 14 and FIG. 15 themselves may be utilized as the wire grid polarizer 100 without removing the planarization layer 114, however, removing the planarization layer 114 may reduce a thickness of the display device 1000 and improve a refractive index thereof.

According to an exemplary embodiment, prior to removing the planarization layer 114, a step of forming a transparent grid 140 by filling a transparent material in the wire grid polarizer 100 illustrated in FIG. 14 and FIG. 15 may further be performed.

Figure 16:
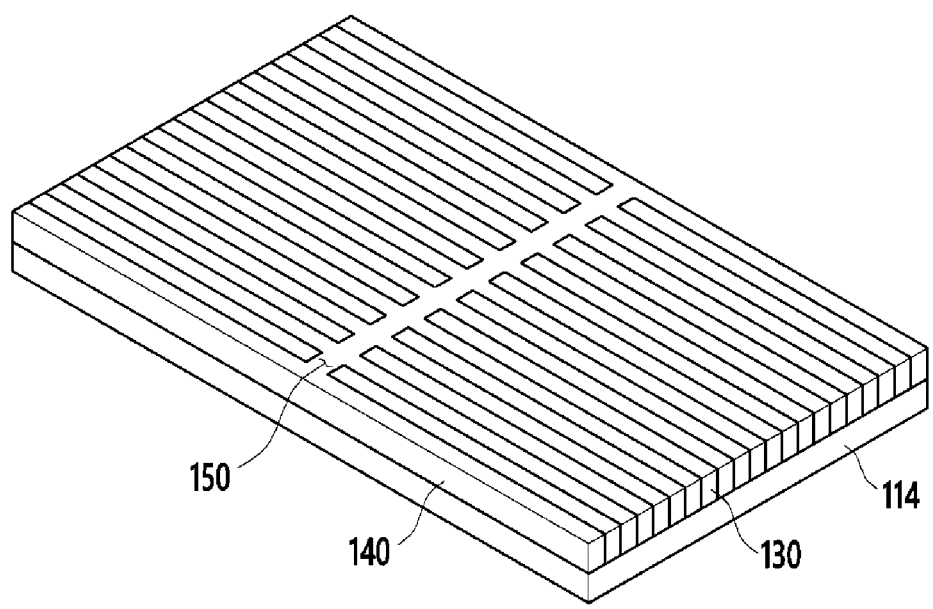
FIG. 16 is a perspective view schematically illustrating how a transparent material is charged in the wire grid polarizer of FIG. 14 according to an exemplary embodiment.
Figure 16:
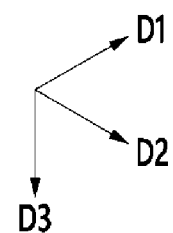
Figure 17:
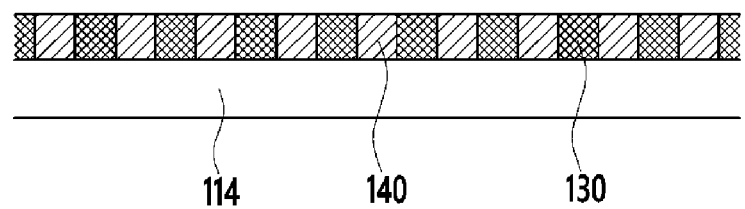
FIG. 17 is a side view illustrating FIG. 14 when viewed in the second direction.

FIG. 16 is a perspective view schematically illustrating how a transparent material charged in the wire grid polarizer 100 of FIG. 14, and FIG. 17 is a side view illustrating FIG. 14 when viewed in the second direction D2, according to an exemplary embodiment. As illustrated in FIG. 16 and FIG. 17, the transparent material may be filled between the parts of the wire grid 130 and in the grid bridge 150. As used herein, the transparent material filled between the parts of the wire grid 130 is referred to as the transparent grid 140.

The transparent material may include a ceramic, such as glass or quartz, or various resins, such as acryl, TAC (triacetyl cellulose), COP (cyclo olefin polymer), COC (cyclic olefin copolymer), PC (polycarbonate), PET (polyethylene terephthalate), PI (polyimide), PEN (polyethylene naphthalate), PES (polyether sulfone), and PAR (polyarylate), without being limited thereto.

The transparent grid 140 may connect the parts of the wire grid 130 disconnected by the grid bridge 150 and maintain the shape of the wire grid polarizer 100. The transparent grid 140 may also to improve light-emission performance by controlling the refractive index of light transferred from the display panel 200 disposed in the display device 1000, which will be described later. Therefore, the transparent grid 140 may include various materials having a transparent property and appropriate refractive indexes for improving the light-emission performance.

Figure 18:
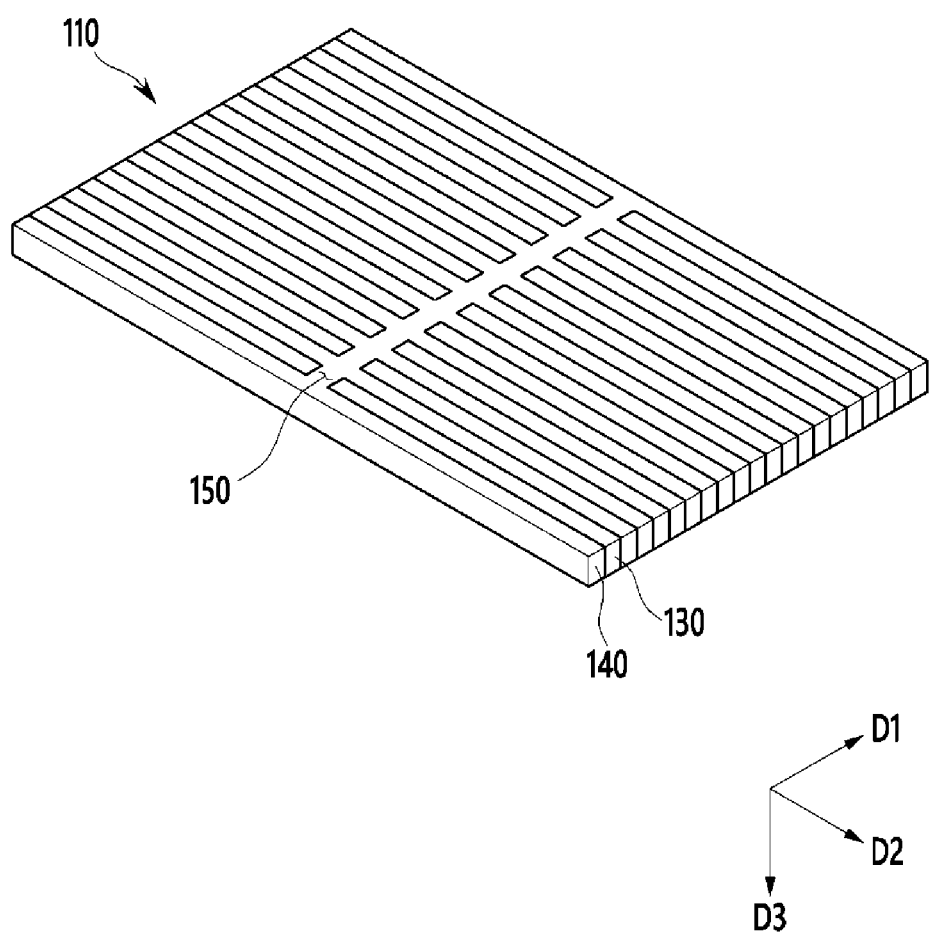
FIG. 18 is a perspective view schematically illustrating a wire grid polarizer in which a planarization layer of FIG. 16 is removed according to an exemplary embodiment.
Figure 19:
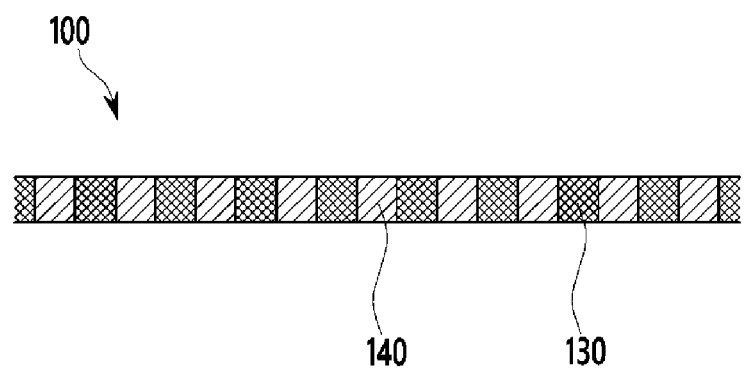
FIG. 19 is a side view illustrating FIG. 18 when viewed in the second direction.

A step of removing the planarization layer 114 may be performed after the transparent grid 140 is formed. FIG. 18 is a perspective view schematically illustrating the wire grid polarizer 100 in which the planarization layer 114 of FIG. 16 is removed, and FIG. 19 is a side view illustrating FIG. 18 when viewed in the second direction D2. After the planarization layer 114 is removed, manufacturing the wire grid polarizer 100 according to an exemplary embodiment is completed, as illustrated in FIG. 18 and FIG. 19.

As described above, the wire grid polarizer 100 according to an exemplary embodiment may include the engraved trench 118 in the wire grid polarizer substrate 110, which is may allow smooth filling of the liquid mask resin 120, thereby preventing the occurrence of defects.

Hereinafter, the wire grid polarizer 100 according to an exemplary embodiment will be described with reference to FIG. 18 and FIG. 19. As illustrated in FIG. 18 and FIG. 19, the wire grid polarizer 100 includes the grid bridge 150, the transparent grid 140, and the wire grid 130.

The grid bridge 150 extends in the first direction D1, and the transparent grid 140 and the wire grid 130 extend in the second direction D2 crossing the first direction D1. The transparent grid 140 may include a plurality of parts of the transparent grid 140, which extend from the grid bridge 150 along the second direction D2, and the parts of the wire grid 130 may be disposed between the respective parts of the transparent grid 140. The parts of the wire grid 130 extend along the second direction D2, and are disconnected by the grid bridge 150 crossing the second direction D2.

As described above, the transparent grid 140 and the grid bridge 150 may be formed by filling the transparent material therein after the parts of the wire grid 130 are formed, and thus the transparent grid 140 and the grid bridge 150 may be filled with the same material.

The parts of the wire grid 130 may include at least one metal of aluminum (Al), chromium (Cr), gold (Au), silver (Ag), copper (Cu), nickel (Ni), iron (Fe), tungsten (W), cobalt (Co), and molybdenum (Mo), an alloy thereof, or an oxide or nitride thereof.

Figure 20:
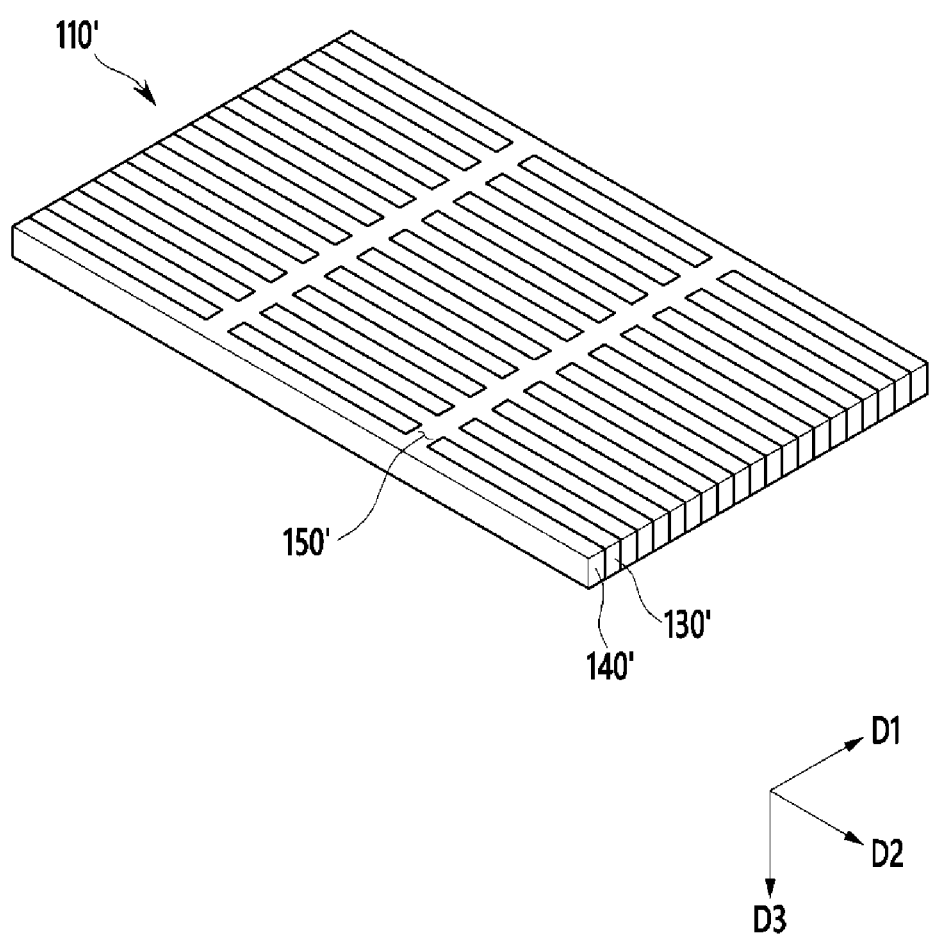
FIG. 20 is a perspective view schematically illustrating a wire grid polarizer according to an exemplary embodiment.

FIG. 20 is a perspective view schematically illustrating a wire grid polarizer substrate 110' according to an exemplary embodiment. As illustrated in FIG. 20, the wire grid polarizer substrate 110' may have two or more grid bridges 150' disposed in parallel along the first direction D1. As such, the parts of the wire grid 130' extending along the second direction D2 are disconnected multiple times by the two or more grid bridges 150'.

In addition, the wire grid polarizer substrate 110' according to an exemplary embodiment is used in the display device. Accordingly, the number and width of the grid bridges 150', the parts of the transparent grid 140', and the parts of the wire grid 130' included in the wire grid polarizer substrate 110' may be varied depending on the design of the display device.

Figure 21:
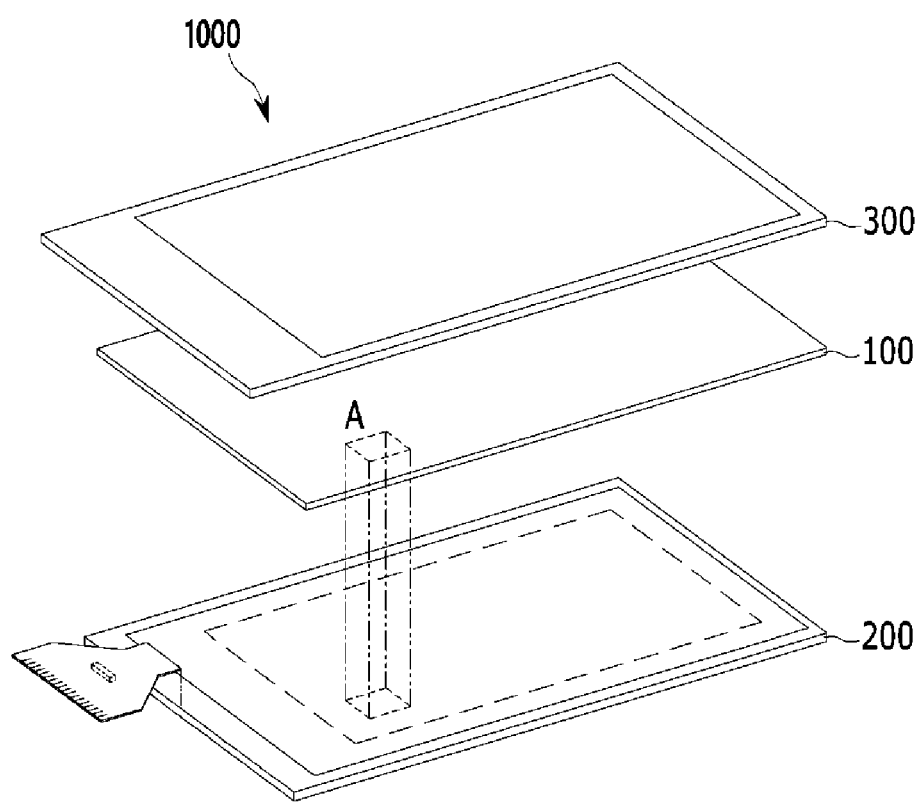
FIG. 21 is a perspective view schematically illustrating a display device according to an exemplary embodiment.

Hereinafter, the display device 1000 according to an exemplary embodiment will be described with reference to FIG. 21 to FIG. 23. FIG. 21 is a perspective view schematically illustrating the display device 1000 according to an exemplary embodiment, FIG. 22 is a cross-sectional view schematically illustrating a cross-section of the display device 1000 according to an exemplary embodiment, and FIG. 23 is an enlarged view illustrating an area A of FIG. 21.

Figure 22:
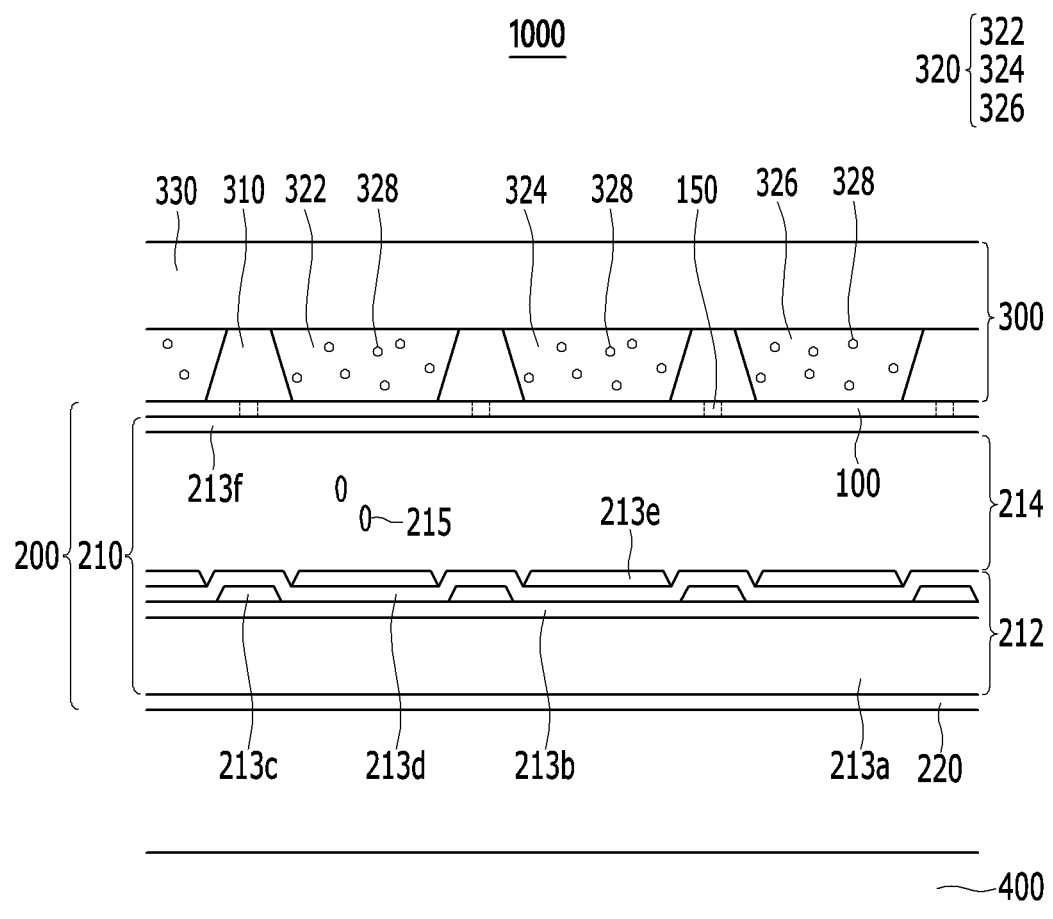
FIG. 22 is a cross-sectional view schematically illustrating a cross-section of a display device according to an exemplary embodiment.
Figure 23:
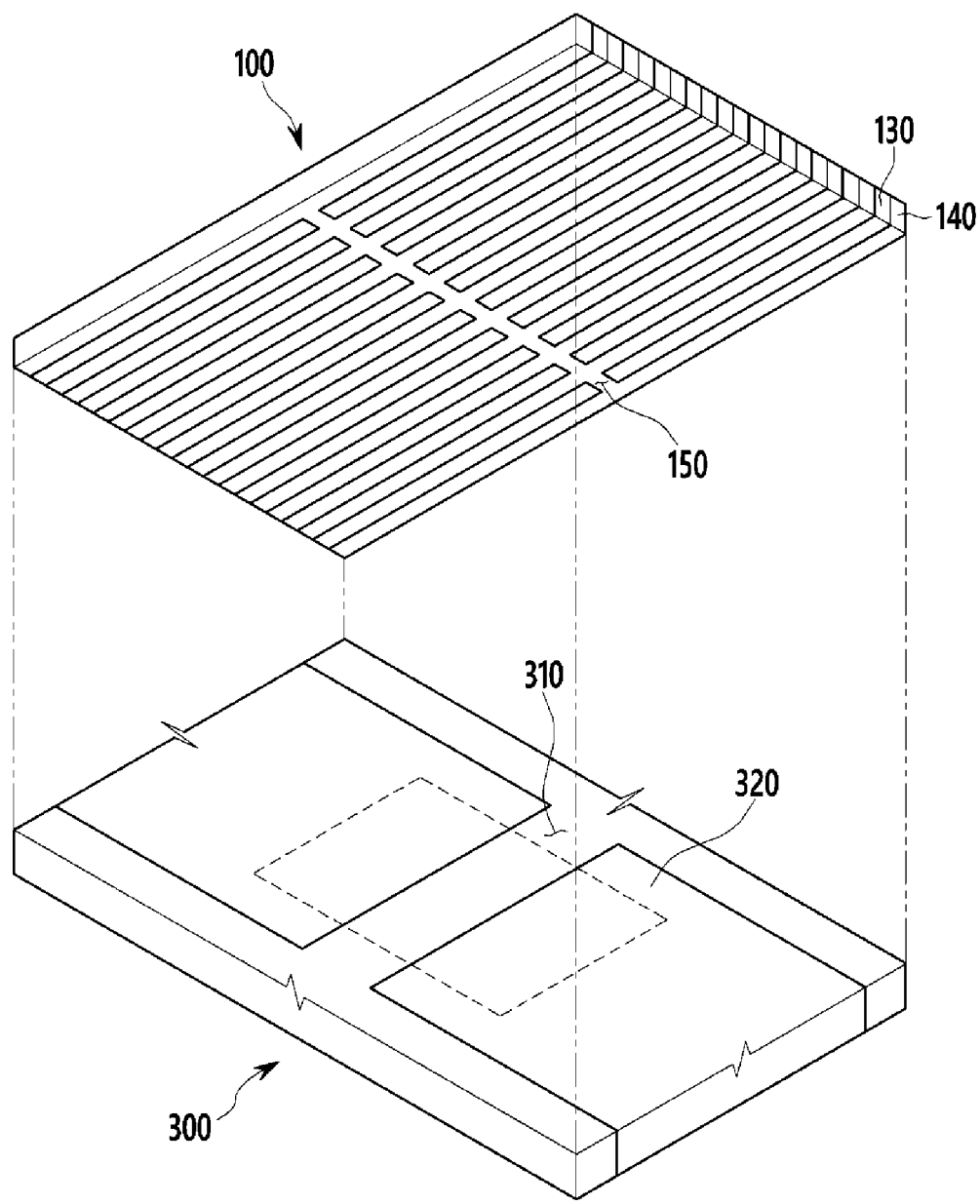
FIG. 23 is an enlarged view illustrating an area A of FIG. 21.

As illustrated in FIGS. 21 and 22, the display device 1000 according to an exemplary embodiment includes a color conversion panel 300, a display panel 200 contacting the color conversion panel 300, and a light assembly 400.

The color conversion panel 300 may include a color conversion panel substrate 330, a plurality of color conversion layers 320 disposed on the color conversion panel substrate 330, and light blocking members 310 disposed between the color conversion layers 320. Specifically, the color conversion panel 300 includes a plurality of color conversion layers 322 and 324 disposed on a surface of the color conversion panel substrate 330, which faces a liquid crystal panel substrate 213a, a transmission layer 326, and light blocking members 310 disposed between the transmission layer 326 and the color conversion layers 322 and 324.

The color conversion layers 320 may convert introduced light into different colors of light, and may include, e.g., a red color conversion layer 322 and a green color conversion layer 324. The transmission layer 326 may emit the introduced light without color conversion. For example, the transmission layer 326 may receive blue light and emit the blue light.

According to an exemplary embodiment, the color conversion layers 320 may include quantum dots 328. The quantum dots 328 may change a wavelength of light passing through the color conversion layers 320, which may improve a light viewing angle by emitting light passing through the quantum dots 328 in all directions. The light blocking members 310 may define regions between adjacent color conversion layers 320, at which the red color conversion layers 322, the green color conversion layers 324, and the transmission layer 326 are disposed. The color conversion layers 320 adjacent to the light blocking members 310 are partially overlapped with each other depending on the manufacturing process.

The display panel 200 may include a liquid crystal panel 210 forming a vertical electric field, but the present invention is not limited thereto. For example, the display panel 200 may include a liquid crystal panel, a plasma display panel (PDP), an organic light emitting diode (OLED) display, a surface conduction electron-emitter display (SED), a field emission display (FED), a vacuum fluorescent display (VFD), or an E-paper.

The display panel 200 may include a liquid crystal panel 210 for displaying images, and a wire grid polarizer 100 according to exemplary embodiments may be disposed on one surface or opposite surfaces of the liquid crystal panel 210 to polarize light introduced from a light assembly 400.

The liquid crystal panel 210 includes a lower display panel 212 including a thin-film transistor to display images, and a liquid crystal layer 214 disposed on the lower display panel 212.

A plurality of pixel electrodes are disposed in a matrix form on the liquid crystal panel substrate 213*a* included in the lower display panel 212. The liquid crystal panel substrate 213*a* further includes a gate line (not illustrated) including a gate electrode (not illustrated), which extends in a row direction, a gate insulating layer 213*b* disposed on the gate line, and a semiconductor layer (not illustrated) disposed on the gate insulating layer 213*b*. In addition, a data line 213*c* and a drain electrode (not illustrated) may be disposed on the semiconductor layer, extend in a column direction, and include a source electrode (not illustrated). Further, a passivation layer 213*d* may be disposed on the data line 213*c* and the drain electrode, and a pixel electrode 213*e* may be physically and/or electrically connected to the drain electrode through a contact hole (not illustrated).

The semiconductor layer disposed on the gate electrode forms a channel layer in an area exposed by the source electrode and the drain electrode. The gate electrode, the semiconductor layer, the source electrode, and the drain electrode may constitute one thin-film transistor.

A color conversion panel substrate 330 is disposed to overlap with and separated from the liquid crystal panel substrate 213*a*. A light blocking member 310 and a common electrode 213*f* are disposed between the color conversion panel substrate 330 and the liquid crystal layer 214.

The common electrode 213*f* receiving a common voltage is disposed to face the pixel electrode 213*e*, interposing the liquid crystal layer 214, to generate an electric field together with the pixel electrode 213*e* in order to control the arrangement of a plurality of liquid crystal molecules 215 of the liquid crystal layer 214.

The liquid crystal layer 214 includes the liquid crystal molecules 215, and an alignment direction of the liquid crystal molecules 215 is controlled by an electric field formed between the pixel electrode 213*e* and the common electrode 213*f*. As such, images may be displayed by controlling transmittance of light received from the light assembly 400 depending on the alignment of the liquid crystal molecules 215.

Although not illustrated, a first alignment layer may be further disposed between the pixel electrode 213*e* and the liquid crystal layer 214, and a second alignment layer may be further disposed between the common electrode 213*f* and the liquid crystal layer 214.

The light assembly 400 may include a light source disposed below the display panel 200 for generating light, and a light guide (not illustrated) for guiding light towards the display panel 200 and the color conversion panel 300. When the display panel 200 is a self-emitting display device, the light assembly 400 may be omitted. For example, the light assembly 400 may include at least one light emitting diode (LED), e.g., a blue light emitting diode. A light source may be an edge-type light assembly on one side surface of the light guide, or may be a direct-type light assembly 400 disposed directly below the light guide.

A polarizer 220 may be provided below the liquid crystal panel substrate 213*a* adjacent to the light assembly 400 in order to polarize light generated from the light assembly 400 and supplied to the liquid crystal panel substrate 213*a*. At least one of a coating-type polarizer and a wire grid polarizer according to exemplary embodiments may be employed as the polarizer 220. The polarizer 220 may be disposed at one surface of the display panel in various forms such as a film form, a coated form, and an attached form, without being limited thereto.

In addition, as illustrated in FIG. 22, the display device 1000 according to an exemplary embodiment includes the wire grid polarizer 100 and the display panel 200. Further, although not illustrated, the display device 1000 may also include a signal input unit (not illustrated) for receiving a signal inputted from the outside, and a window (not illustrated) for protecting the display panel 200 and the signal input unit.

A portion of the display panel 200 including light blocking members 310 disposed at respective edges of a plurality of sub-color conversion members 322, 324, and 326 is illustrated in FIG. 22. Each of the sub-color conversion members 322, 324, and 326 may display one of red, green, blue, and white, without being limited thereto. In addition, any basic color unit for displaying various color units may be included in the scope of the present invention.

According to an exemplary embodiment, the wire grid polarizer 100 includes a plurality of parts of the wire grid 130 disposed in parallel along the second direction D2 to polarize light emitted from a display element layer, such as the liquid crystal panel 210. A plurality of parts of the transparent grid 140, which are filled with a transparent material to control a refractive index of light emitted from the display element layer, such as the liquid crystal panel 210, are disposed in parallel along the second direction D2. The parts of the transparent grid 140 are connected by the grid bridge 150 that extends along the first direction D1 crossing the second direction D2, and the parts of the wire grid 130 extended along the second direction D2 are disconnected by the grid bridge 150.

In this case, the grid bridge 150 may be disposed on a portion that does not emit light from the display panel 200, such as a light blocking member 310, in order to prevent deterioration of a polarization characteristic thereof. FIG. 22 schematically illustrates the grid bridge 150 disposed to correspond to the light blocking member 310 formed between color conversion layer 320.

Accordingly, when the grid bridge 150 includes a plurality of grid bridges 150 formed along the first direction D1, a width of the grid bridges may correspond to a distance between pixels. The polarization characteristic is achieved by dividing light vibrating along various directions into light vibrating in only one direction. Therefore, light vibrating in another direction is blocked by the parts of the wire grid 130 extended in the second direction D2, and the polarization characteristic may be obtained by only allowing light vibrating in a direction parallel to the second direction D2 to pass through the transparent grid 140, which is formed between the parts of the wire grid 130 extending along the second direction D2.

In this case, the grid bridge 150 extends along the first direction D1 crossing the second direction D2, and thus light vibrating in a direction parallel to the first direction D1 may pass therethrough. Accordingly, the polarization characteristic of the display device 1000 may be maintained by disposing the grid bridge 150 on the light blocking member 310, through which light does not pass.

In addition, a width of the grid bridge 150 measured along a direction parallel to the second direction D2 may be smaller than that of the light blocking member 310 in order to more effectively maintain and/or improve the polarization characteristic. As such, when the grid bridge 150 is projected onto the light blocking member 310, the grid bridge 150 is included in a portion, in which the light blocking member 310 is formed, in a direction parallel to the second direction D2. Therefore, although the grid bridge 150 is formed, the polarization characteristic is not affected.

Hereinabove, the wire grid polarizer substrate 110 and manufacturing methods of the wire grid polarizer 100 using the same have been described. In addition, the wire grid polarizer 100 manufactured by using the wire grid polarizer substrate 110 and the display device 1000 including the same have been described.

According to the exemplary embodiments, the liquid mask resin 120 coated on the wire grid polarizer substrate 110 for an imprint process may be uniformly filled in the imprint mold by the engraved trench 118 formed in the wire grid polarizer substrate 110. As such, product defects that may occur by bubble generation or filling failure in the liquid mask resin 120 caused by the capillary phenomenon and the spread anisotropy may be prevented.

In addition, an optical deterioration of the wire grid polarizer 100 caused by a phenomenon such as bubble generation or filling failure may be prevented. Furthermore, product quality related to the polarization characteristic may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A manufacturing method of a wire grid polarizer, the method comprising:

forming a wire grid polarizer substrate comprising an engraved trench extending along a first direction;

applying a liquid mask resin to the wire grid polarizer substrate;

imprinting the liquid mask resin by using a wire grid polarizer mold comprising an imprint mold pattern;

forming an etching mask by curing the liquid mask resin;

forming a wire grid by removing a portion of the wire grid polarizer substrate; and forming a grid bridge by removing the etching mask.

2. The manufacturing method of claim 1, further comprising forming a transparent grid by filling a transparent material in the wire grid polarizer substrate from which the etching mask is removed.

3. The manufacturing method of claim 1, wherein:

the wire grid polarizer substrate further comprises a planarization layer disposed on a first surface of the wire grid polarizer substrate; and the method further comprises removing the planarization layer after the etching mask is removed.

4. The manufacturing method of claim 1, wherein:

the wire grid polarizer substrate further comprises a wire grid base layer and an anti-oxidation layer disposed on the wire grid base layer; and forming the wire grid comprises:

first etching a portion of the anti-oxidation layer; and second etching a portion of the wire grid base layer.

5. The manufacturing method of claim 1, wherein the engraved trench is formed in the wire grid polarizer substrate by removing a portion of the wire grid polarizer substrate with a photoresist process.

6. The manufacturing method of claim 1, wherein the engraved trench is formed in the wire grid polarizer substrate by removing a portion of the wire grid polarizer substrate via laser cutting.

7. The manufacturing method of claim 1, wherein the liquid mask resin is coated on the wire grid polarizer substrate by an inkjet method.

* * * * *